United States Patent
Vainio et al.

(10) Patent No.: US 6,577,721 B1
(45) Date of Patent: Jun. 10, 2003

(54) CONFERENCE CALL

(75) Inventors: Aimo Vainio, Irving, TX (US); Arto Pussinen, Oulu (FI); Sakari A Pelkonen, Oulu (FI); Keijo Raiha, Il (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/302,811

(22) Filed: Apr. 30, 1999

(30) Foreign Application Priority Data

May 1, 1998 (GB) .............................................. 9809413

(51) Int. Cl.$^7$ ............................................... H04M 3/42
(52) U.S. Cl. ............................ 379/202.01; 379/204.01; 379/205.01
(58) Field of Search ....................... 379/202.01, 204.01, 379/207.01, 205.01; 455/433, 445, 456, 519, 560

(56) References Cited

U.S. PATENT DOCUMENTS

| | | | |
|---|---|---|---|
| 5,583,925 A | 12/1996 | Bernstein | ..................... 379/202 |
| 5,692,032 A | 11/1997 | Seppanen et al. | ............. 379/59 |
| 5,794,142 A | 8/1998 | Vanttila et al. | ............. 455/419 |
| 5,845,205 A | 12/1998 | Alanara et al. | ............. 455/564 |
| 5,870,683 A | 2/1999 | Wells et al. | ................ 455/566 |
| 5,878,351 A | 3/1999 | Alanara et al. | ............. 455/466 |
| 5,887,264 A | 3/1999 | Kohler | ....................... 455/461 |
| 5,892,475 A | 4/1999 | Palatsi | ........................ 345/352 |
| 5,924,041 A * | 7/1999 | Alperovich et al. | ......... 455/456 |
| 6,192,123 B1 * | 2/2001 | Grunsted et al. | .... 379/93.17 X |
| 6,240,069 B1 * | 5/2001 | Alperovich et al. | ........ 455/456 |
| 6,363,258 B1 * | 3/2002 | Schmidt et al. | ............. 455/514 |

* cited by examiner

Primary Examiner—Creighton Smith
(74) Attorney, Agent, or Firm—Perman & Green, LLP

(57) ABSTRACT

A telephone for setting up a conference call, the telephone comprising a memory for storing data relating to a first and second user; control means for retrieving said data from the memory and originating a call to the first user the control means being responsive to a signal indicating that the first call has been established originates a call to the second user.

16 Claims, 3 Drawing Sheets

CONFERENCE CALL

BACKGROUND OF THE INVENTION

This invention relates to an apparatus and method for setting up a conference call in a telecommunication network.

Many telephone network systems allow subscribers to establish conference calls with other network users. Thus allowing three or more users to participate in one phone conversation.

Typically a conference call is set up by the originating caller (the calling party) establishing a first call with one of the conference call participants. Once this call has been established the calling party then places a second call with another conference call participant. Once this second call has been established the calling party instructs the network to join the two calls so allowing the three participants to participate in one phone conversation. If there are further conference call participants this process is repeated until all participants are connected into the same conference call. Most current networks also require that established calls to conference call participants be placed on hold while further connections to participating parties are established.

The process for establishing each call varies depending upon which type of network the calling and called parties are connected too. Typically however the process involves inputting, manually or from memory, into the calling parties telephone the called telephone number. This number is transmitted from the calling telephone to the telecommunication network. In a wireless telecommunication network the user will usually instruct the radio telephone to transmit this number by pressing a 'send' key. The telecommunication network then contacts the called party and if the called party is free establishes a connection between the called and calling parties.

For a user to place a call on hold using a radio telephone typically the user selects a 'hold' instruction displayed as a menu selection on the radio telephone's display. For a wire line telephone the user typically manually inputs codes, for example a star key followed by a designated number. The telephone transmits these codes/instructions to the telecommunication network which then places the designated call on hold.

For a user to join two or more calls typically the user has to manually input codes into the telephone or select an instruction from a menu as described above. The telephone then transmits these codes/instructions to the telecommunication network which then joins the designated calls.

Therefore, to establish a conference call the calling party has to repeatedly perform three different manual tasks. First, input a telephone number into the telephone for transmission to the telecommunication network. Second, instruct the network to place established calls on hold. Third, instruct the network to join held calls with a newly established active call.

This process can be difficult and time consuming to perform. Even a conference call only involving a few participants requires the calling party to make many telephone key presses/selections; this increases the chance of a mistake which can result in, for example, lost connections and/or wrong numbers being dialled.

SUMMARY OF THE INVENTION

In accordance with one aspect of the present invention, there is provided a telephone for setting up a conference call, the telephone comprising a memory for storing data relating to a first and second user; control means for retrieving said data from the memory and originating a call to the first user, the control means being responsive to a signal indicating that the first call has been established to originate a call to the second user.

This invention allows a conference call to be set up with minimum intervention from the calling party. So simplifying the process of setting up the conference call for the calling party. Once the user has selected the conference call function and designated a specific conference call group this invention allows the conference call to be set up without any further intervention from the calling party.

Preferably the control means requests that the call to the first user is placed on hold in response to a signal from indicating that the first call has been established.

Preferably the control means requests that the call to that the call to the first user is joined with the call to the second user in response to a signal indicating that the second call has been established.

Suitably the telephone further comprises a keypad wherein the request to place the call to the first user on hold is made in response to a key selection by a user.

Preferably the user data includes a user name and telephone number.

Preferably the stored data comprises a list of users linked to form a group.

According to a second aspect of the present invention, we provide a method of setting up a conference call, the method comprising retrieving data relating to a first and second user and establishing a call to the first user then establishing a call to the second user in response to a signal indicating that the first call has been established.

Preferably the first user is placed on hold in response to a signal indicating that the first call has been established.

BRIEF DESCRIPTION OF THE DRAWINGS

Examples of apparatus and methods in accordance with the invention will now be described with reference to the accompanying drawings, in which.

DETAILED DESCRIPTION OF THE INVENTION

This invention is applicable to apparatus suitable for operation in both wired and wireless telecommunication networks. This embodiment describes an apparatus and method in accordance with this invention that operates over a wireless telecommunication network.

Figure 1:
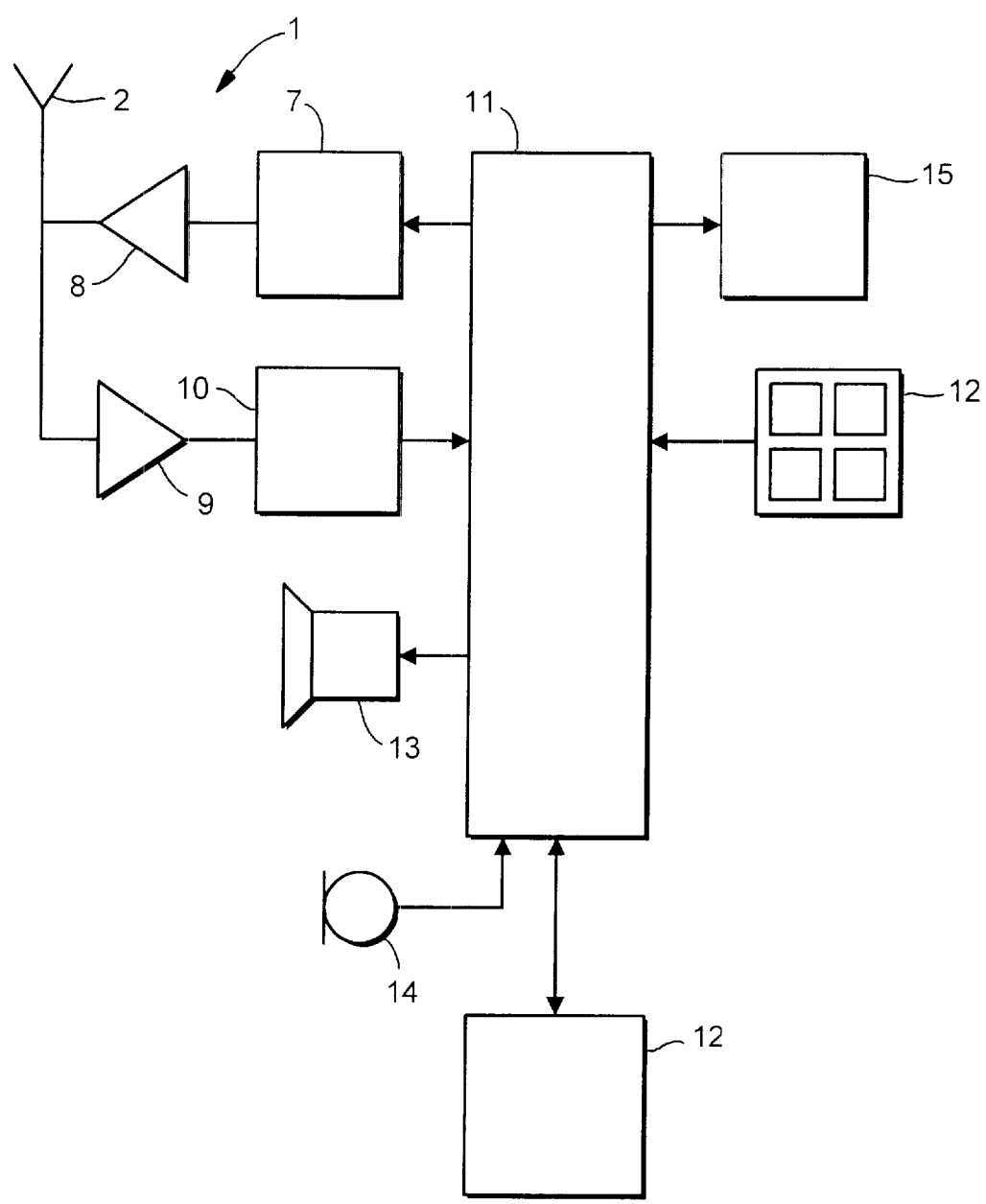
FIG. 1 shows a schematic block diagram of one embodiment of the telephone apparatus.
Figure 2:
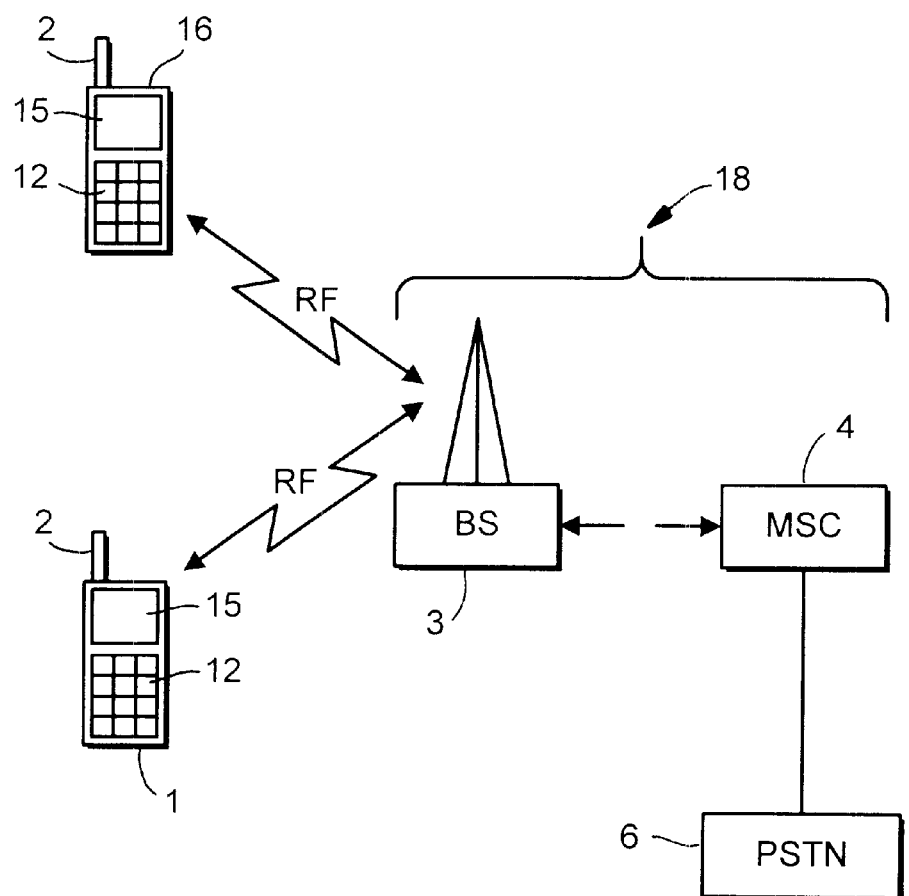
FIG. 2 illustrates a telecommunication network incorporating a telephone as shown in FIG. 1.

FIGS. 1 and 2 shows a radio telephone 1 incorporating an antenna 2 for transmitting signals to and for receiving signals from a base station 3. The base station 3 is a part of a wireless telecommunication network 18, typically a cellular system such as GSM or CDMA, including a mobile switching centre 5. The mobile switching centre 5 provides a connection to a wired telecommunication network, in this embodiment the PSTN 6.

The radio telephone 1 is of typical configuration and includes a modulator 7, a transmitter 8, a receiver 9, a demodulator 10 and control means 11 that provides signals to and receives from the transmitter 8 and receiver 9 respectively. These signals include signalling information in accordance with the air interface standard of the applicable cellular system, which in this embodiment is GSM, and also speech and/or user generated data. The radio telephone 1 also includes a memory 12 which is connected to the control means 11, typically a processor.

The user interface includes a speaker 13, a microphone 14, a display 15, and a keypad 12, all of which are coupled to the control means 11.

FIG. 2 shows the telecommunication network 18 interfacing, via RF signals, to radio telephone 1. Also interfacing to the telecommunication network 18 is a radio telephone 16 and, via the PSTN, a wired telephone 17. For the purposes of this embodiment neither the radio telephone 16 nor the wired telephone 17 need to incorporate the present invention.

In a cellular system radio telephones 1, 16 may communicate with separate base stations where the base stations would be interfaced by means of the mobile switch centre 4 so allowing communication between radio telephones 1 and 16 or any other telephone on the telecommunication network. The mobile switch centre function is, amongst other things, to monitor and control several base stations, frequency administration and control of the cellular network and to act as the cellular networks interface to wired telecommunication networks, such as the PSTN 6.

Typically the process for setting up a conference call where the calling party is using a radio telephone is as follows. The radio telephone first registers with the wireless telecommunication system. The radio telephone then makes a channel request informing the telecommunication network that it requires a channel to establish a call. The radio telephone then transmits to the network the telephone number that it wants to call. While the call is proceeding, the base station assigns a traffic channel on which the exchange of data is performed. If the called party is not busy, the calling radiotelephone is alerted and the connection is established when the called telephone is brought off the hook (i.e. is answered). Once this call has been established, the calling party, via the radiotelephone, requests the telecommunication network to put this call on hold. The calling party then places another call in the same manner as described above. Once this call has been established the calling party places a request, via the radio telephone, with the network to join both calls. Once both calls have been joined the calling party and both called parties can participate in a single telephone conversation. The above process is repeated until all conference call participants are joined into the conference call.

The operation of the radio telephone 1 shown in FIG. 1 will now be described in connection with the setting up of a conference call in accordance with the present invention.

If a conference call requires to be set up the calling party will select from the radio telephone 1 the conference call function. Typically this selection is via a keypress from a designated key on the radiotelephone keypad 12 or from a menu selection displayed on the display 15. The conference call selection process typically requires the calling party to select a conference call group, via the keypad 12 or menu selection. The conference call group will be a list of two or more conference call participants telephone numbers contained in memory 12 (this is described in detail below). Once the conference call function has been selected and received by the control means 11 with the associated conference call group name, the control means 11 retrieves from memory 12 the associated group of telephone numbers. The telephone numbers may be retrieved and placed in buffer memory (not shown) at the start of the conference call process; to be used by the control means 11 as each call is set up. Alternatively, the control means 11 can retrieve individual group telephone numbers from memory 12 as each call is being set up.

Conference call group telephone numbers will typically be loaded into memory 12 in advance of the conference call being set up. Typically for a user to set up a conference call group in memory 12 the user will first key in the group's name. The name can be selected by the user to enable the user to associate the name with the group of conference call participants, for example 'Dept A' to indicate that this group contains the telephone numbers for department A. Once the group name has been input the participant's telephone numbers need to be input into memory 12 and associated with the relevant group. Equally, participant's telephone numbers already loaded in memory 12 may be selected as part of the conference call group. In addition to the participant's telephone number the user may include other participant details, for example name. This list of conference call participants will be linked in memory 12 to the designated group name, typically by a link list.

The control means 11 then originates a call with one of the conference call participants for the selected group. The process for establishing a call will depend upon which telecommunication network the radio telephone is interfaced to. For a GSM network this involves the calling radio telephone initially placing a channel request with the telecommunication network which responds with a channel assignment. The radio telephone then informs the network that it requires the channel to establish a call. The radio telephone is then required to authenticate itself. Whereupon the telecommunication network instructs the radio telephone to cipher its data. The radio telephone then transmits to the network a set-up message which contains the called parties telephone number. The network routes the call to the desired telephone and assigns a traffic channel for the exchange of user data. If the called telephone is not busy the network alerts the calling radio telephone, typically by the user hearing a ringing tone. The connection is established when the called telephone is brought off the hook. When the connection has been established a connection signal is sent to the calling radio telephone following which the radio telephone transmits an acknowledgement signal to the telecommunication network. This process is specified in GSM standard 04.08. However, a person skilled in the art would appreciate that for all telecommunication networks the connection is established when the called telephone is brought off hook, resulting in a connection signal being transmitted to the calling telephone.

For a wireless telecommunication network the communication interface between the radiotelephone 1 and the base station 3 is via RF signals.

When the control means 11 receives a signal from the telecommunication network 18 that the first call has been established the control means 11 instructs the telecommunication network 18 to place this call on hold. This process is controlled by the control means 11 without any need for manual intervention. The process for placing a call on hold for a GSM network is specified in GSM 04.83. The control means 11 may instruct the telecommunication network to place this call on hold as soon as the call has been established or equally after a specified period of time so to allow the calling party to have an initial conversation with the called party. This feature may be useful in ensuring that a conference call participant knows he is participating in a conference call or ensure that the participant is free to take part in a conference call. If the called party does not answer or is unavailable the connection can be discarded. Equally the radiotelephone 1 may be configured so that the control means 11 only requests the telecommunication network 18 to place the call(s) on hold after a specific key press, or menu selection. This feature enables the calling party to have a conversation with the called party prior to the next call being established.

Once this call has been place on hold, the control means 11 retrieves from memory 12 another telephone number from the selected conference call group and instructs the telecommunication network 18 to establish a connection to this other telephone number. When the control means 11 receives a signal from the telecommunication network that the call has been established the control means 11 requests the telecommunication network 18 to connect these two calls to allow a three-way conversation. The process of joining calls for a GSM network is specified in GSM 04.84.

The above process is repeated by the control means 11 until all the conference call group participants, if they are free to do so, have been joined into the conference call.

Figure 3:
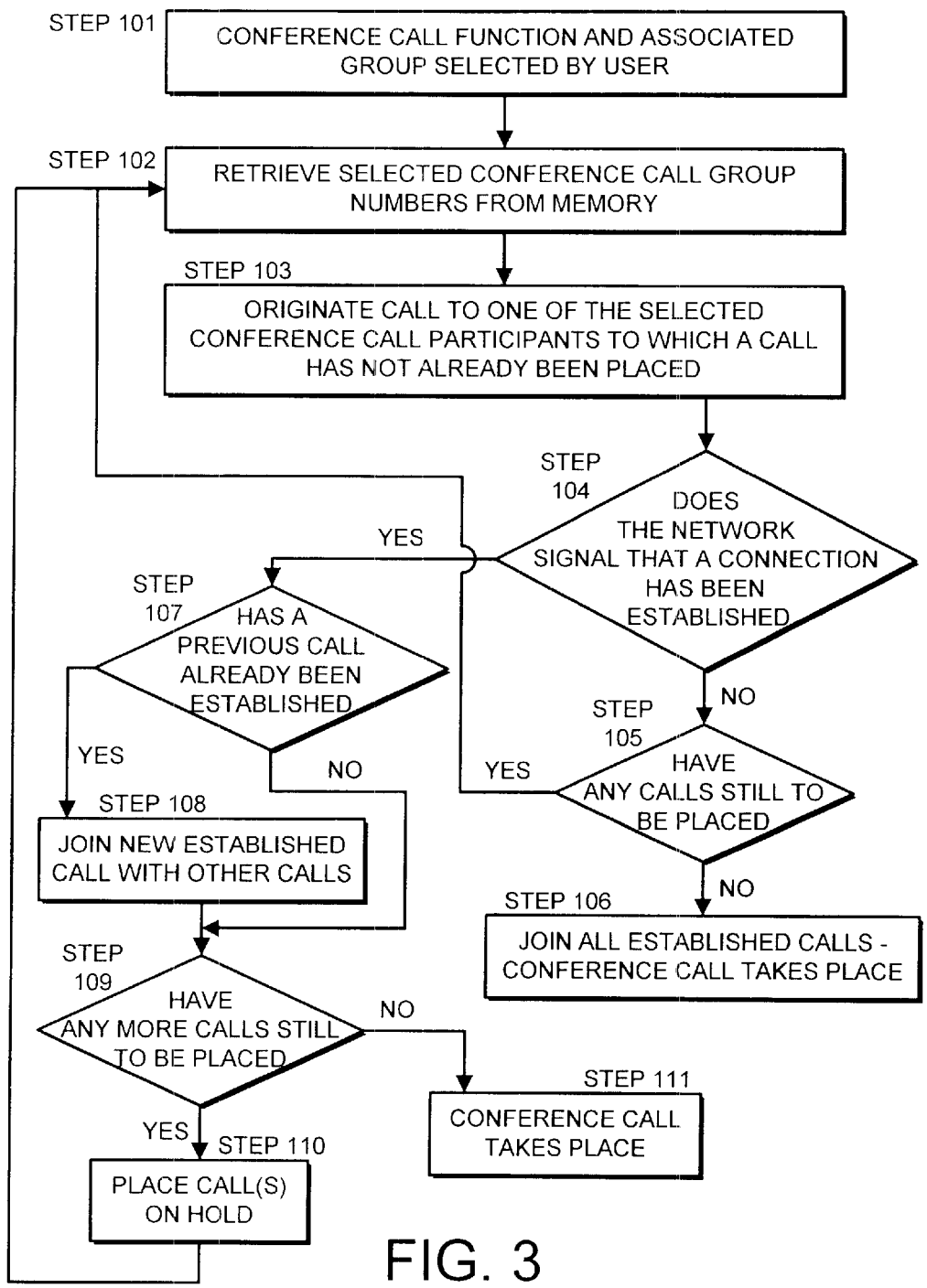
FIG. 3 shows a flow diagram for setting up a conference call in accordance with this invention.

The following describes how a conference call is established between radiotelephone 1, 16 and wired telephone 17 in accordance with the present invention with reference to FIG. 3.

A user will initially set up a conference call group in memory 12. This will typically be via menu selection, displayed on the display 15, where the user is prompted to input a group name, for example 'phone'. Once the user has input the group name the menu will typically prompt the user to input conference call participants names and telephone numbers. For example, radio telephone 16 number is input against name 'User 1' and wired telephone 17 number is input against name 'User 2'. If this conference call group is complete, on user selection, the control means 11 stores this group in memory 12.

When a conference call is to be set up between the calling party and 'User 1' and 'User 2', that is to say conference call group 'phone', the calling party selects, from radio telephone 1, the conference call function (step 101). The control means 11 will, typically via the display 15, prompt the calling party to input the conference call group i.e. 'phone'. On selection of the conference call group (step 101) the control means 11 retrieves from memory 12 one of the telephone numbers listed under 'phone', for example radio telephone 16 (step 102). The control means 11 instructs the wireless telecommunication network 18 to establish a connection with radio telephone 16 (step 103). If the network 18 instructs the radio telephone 1 that a connection can not be established the control means 11 either retrieves the next telephone number in the group, e.g. telephone 17, and instructs the network 18 to establish another connection (steps 104, 102, 103) or, if all group numbers have already been called, join the existing participants to allow the conference call to take place (steps 104, 105, 106). If the telecommunication network 18 signals to the radio telephone 1 that this connection has been established as telephone 17 still has to be called the control means 11 instructs the telecommunication network 18 to place the call to telephone 16 on hold (steps 104, 107, 109 and 110). Once this call has been placed on hold the control means 11 retrieves from memory 12 the next telephone number listed under 'phone', i.e. wired telephone 17 (step 102). The control means 11 instructs the wireless telecommunication network 18 to establish a connection with telephone 17 (step 103). The wireless telecommunication network 18 identifies that this telephone is interfaced to the PSTN 6 so establishes a connection through the mobile switch centre 4 to the PSTN 6 through to telephone 17. If the telecommunication network 18 signals to the radio telephone 1 that this call has been established the control means 11 instructs the telecommunication network 14 to join calls to user 1 and user 2 (step 108). If a connection can not be established then steps 104, 105 and 106 are followed as described above. As there are no further conference call participants listed in 'phone' the conference call for 'phone' has now been established (step 111).

The present invention may include any novel feature or combination of features disclosed herein either explicitly or implicitly or any generalisation thereof irrespective of whether or not it relates to the presently claimed invention or mitigates any or all of the problems addressed. In view of the foregoing description it will be evident to a person skilled in the art that various modifications may be made within the scope of the invention. For example, it will be appreciated that the users may be all be on the same cellular network or on different cellular networks and/or fixed line telecommunication networks.

What is claimed is:

1. A telephone for setting up a conference call, the telephone comprising a memory for storing data relating to a first and second user; control means for retrieving said data from the memory and originating a call to the first user, the control means being responsive to a signal indicating that the first call has been established to originate a call to the second user.

2. A telephone according to claim 1 wherein the control means requests that the call to the first user is placed on hold in response to a signal indicating that the first call has been established.

3. A telephone according to claim 1, wherein the control means requests that the call to the first user is joined with the call to the second user in response to a signal indicating that the second call has been established.

4. A telephone according to claim 1 further comprising a keypad wherein the request to place the call to the first user on hold is made in response to a key selection by a user.

5. A telephone according to claim 1, wherein the user data includes a user name and telephone number.

6. A telephone according to claim 1, wherein the stored data comprises a list of users linked to form a group.

7. A method of operating a telephone to set up a conference call, the method comprising using a control means to retrieve data from a memory for storing data in the telephone relating to a first and second user and establish a first call with the first user and then establish a second call with the second user in response to a signal received by the control means indicating that the first call has been established.

8. A method according to claim 7 wherein the first user is placed on hold in response to a signal indicating that the first call has been established.

9. The telephone of claim 1 wherein the signal indicating that the first call is established is received from a telecommunications network.

10. The telephone of claim 1 wherein the control means is adapted to retrieve the data from memory and originate a call to the first user in response to a command by an operator of the telephone, and wherein the control means automatically originates the call to the second user without further intervention by the operator.

11. The telephone of claim 1 wherein the telephone is adapted to establish the conference call between a plurality of users and wherein only an initial input command by an operator to retrieve the data from memory and establish a conference call is required.

12. The method of claim 7 further comprising the step of receiving a signal that the first call is established from a telecommunications network associated with the first user.

13. The method of claim 7 further comprising the step of an operator activating a conference call function of a telephone and selecting a group of conference call participants, wherein the conference call is established without further manual intervention by the operator.

14. The method of claim 7 further comprising the step of establishing the conference call between a plurality of users and between one or more telecommunication networks, wherein an operator activates an initial conference call set up command and selects a conference call group including the plurality of users, and wherein the conference call is automatically established without further intervention by the operator.

15. The telephone of claim 1 wherein the memory for storing data is integrated into the telephone.

16. The telephone of claim 1 wherein the control means is integrated into the telephone and includes a conference call function adapted to be activated by the user to initiate the conference call.

* * * * *